United States Patent [19]

Ferracini

[11] 4,198,660
[45] Apr. 15, 1980

[54] SUPPLY CIRCUIT

[75] Inventor: Flavio Ferracini, Turin, Italy

[73] Assignee: Indesit Industria Elettrodomestici Italiana S.p.A., Italy

[21] Appl. No.: 924,686

[22] Filed: Jul. 14, 1978

[30] Foreign Application Priority Data

Jul. 18, 1977 [IT] Italy ................ 68656 A/77

[51] Int. Cl.$^2$ .......................... H04N 3/18
[52] U.S. Cl. ................. 358/190; 328/262; 307/150; 455/299
[58] Field of Search ............. 358/190; 325/492, 494; 328/258, 259, 262, 263, 267; 330/199; 331/185; 307/150; 321/247; 323/17; 317/51

[56] References Cited

U.S. PATENT DOCUMENTS

| | | | |
|---|---|---|---|
| 3,368,105 | 2/1968 | Shimada | 358/190 |
| 3,433,896 | 3/1969 | Sakai et al. | 358/190 |
| 3,466,472 | 9/1969 | Van de More | 307/293 |
| 3,766,314 | 10/1973 | Riechmann | 358/190 |

*Primary Examiner*—Richard Murray
*Attorney, Agent, or Firm*—Lerner, David, Littenberg & Samuel

[57] ABSTRACT

A D.C. supply circuit for a television receiver which has a load circuit including at least one controllable semiconductor switch, the supply circuit comprising means for rectifying an alternating mains supply, a smoothing circuit connected between the rectifying means and load circuit and delay means for delaying the application of the full rectified and smoothed voltage to the load circuit when the receiver is initially turned on, wherein the delay means include means for inhibiting a certain number of cycles of the rectified A.C. voltage from being applied to the said smoothing means, so as to provide a D.C. voltage in which the number of cycles inhibited from reaching the smoothing means determines the delay with which the said D.C. voltage reaches the full value at the load circuit.

16 Claims, 2 Drawing Figures

SUPPLY CIRCUIT

The present invention relates to a D.C. supply circuit for a television receiver which has a load circuit including at least one controllable semiconductor switch, such as a thyristor, the supply circuit comprising means for rectifying an alternating mains supply, a smoothing circuit connected between the rectifying means and the load circuit and delay means for delaying the application of the full rectified and smoothed voltage to the load circuit when the receiver is initially turned on.

In circuits of this type, this delay is required to prevent the D.C. supply and pilot voltages from being applied simultaneously to the output and thyristor control terminals respectively when the television receiver is turned on. Without this delay, parasitic oscillations would be produced which, in the case of a circuit forming part of a television horizontal deflection circuit containing a large number of resonant circuits, would be serious enough to produce overvoltages capable of causing break-down the semiconductor.

One known way of providing this delay is to include in the circuit components whose characteristics vary according to temperature and, consequently, the current flowing through them. These components, whether PTC (positive temperature coefficient) or NTC (negative temperature coefficient), are connected so that, initially, they absorb most of the voltage directed to the thyristor output terminal, after which, the current flowing through them causes them to heat up and be cut out of the circuit.

One drawback of this type of circuit, however, is that it takes a long time for the initial operating condition to be restored (receiver off). This means that if the operator turns the receiver off and on in the space of a few minutes, there is a risk of damaging the thyristor in that the delay circuit has not yet returned to its initial condition. In fact, as long as the PTC or NTC is warm, the delay circuit does not work.

BRIEF DESCRIPTION OF THE INVENTION

With a view to mitigating the disadvantages encountered with the known circuits, the present invention provides a D.C. supply circuit for a television receiver which has a load circuit including at least one controllable semiconductor switch, the supply circuit comprising means for rectifying an alternating mains supply, a smoothing circuit connected between the rectifying means and load circuit and delay means for delaying the application of the full rectified and smoothed voltage to the load circuit when the receiver is initially turned on, wherein the delay means include means for inhibiting a certain number of cycles of the rectified A.C. voltage from being applied to the said smoothing means, so as to provide a D.C. voltage in which the number of cycles prevented from reaching the smoothing means determines the delay with which the said D.C. voltage reaches the full value at the load circuit.

BRIEF DESCRIPTION OF THE FIGURES

The invention will now be described, by way of a non-limiting example, with reference to the attached drawings, in which.

DETAILED DESCRIPTION OF THE INVENTION

Figure 1:
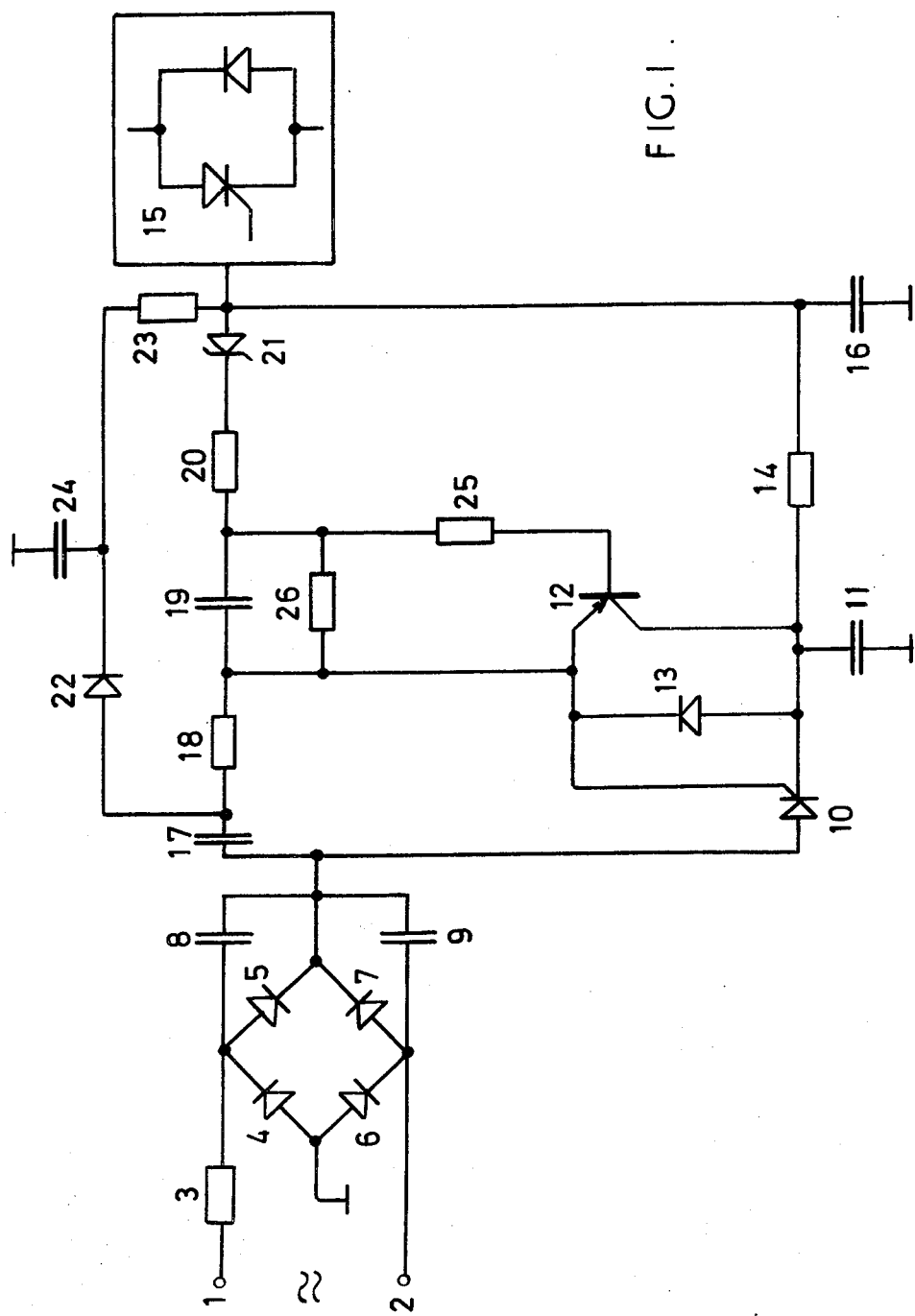
FIG. 1 shows one possible application of the supply circuit embodying the principles of the present invention.

Numerals 1 and 2 in FIG. 1 are used to designate two input terminals of the supply circuit which are intended for connection to the mains supply. Numeral 3 represents a current-limiting resistor connected between terminal 1 and one input of a full wave diode bridge rectifier formed of diodes 4, 5, 6 and 7. A filter capacitor 8, is connected between one D.C. output terminal of the diode bridge and the resistor 3 and a second capacitor 9 sharing the same function, is connected between the D.C. output of the bridge and input terminal 2. The output of the diode bridge is connected to the anode of thyristor 10 which has its cathode connected to ground by way of a smoothing capacitor 11 and its gate connected to the emitter of PNP transistor 12 which acts as protection. The collector of transistor 12 is connected to the cathode of thyristor 10. A diode 13 is also connected between the emitter and collector of transistor 12. The cathode of thyristor 10 is further connected, through a resistor 14, to a group of horizontal or line deflection circuits indicated schematically in the Figure by block 15, to the input of which a filter capacitor 16 is also connected.

To understand the description given below of how the circuit works, block 15 may be considered as providing a load equivalent to a 500 Ohm resistor.

The output of the diode bridge is also connected to the input of block 15 by way of a capacitor 17, resistor 18, a capacitor 19, a resistor 20 and a Zener diode 21, connected in series with one another.

A diode 22 and resistor 23 are also connected between the junction of capacitor 17 and resistor 18 and the input of block 15.

A capacitor 24 is connected between the cathode of diode 22 and ground.

A biasing resistor 25 is connected between the base of transistor 12 and the junction of capacitor 19 and resistor 20. A resistor 26 is connected in parallel with the capacitor 19.

Operation of the circuit will now be described with reference to the waveforms shown in FIG. 2 in which $V_{C24}$ indicates the voltage curve at the terminals of condenser 24 and $V_{C16}$ the voltage curve at the terminals of condenser $C_{16}$ at corresponding times.

Under normal running conditions, the supply voltage from the mains supply is full wave rectified by diodes 4, 5, 6 and 7, and passes via the thyristor 10 be be smoothed by capacitors 11 and 16 and resistor 14, then applied to block 15. The thyristor 10 regulates the current supplied to block 15 and receives gating pulses via capacitor 17 and resistor 18, which introduce a suitable phase shift, and conducts in time with the conduction period of the bridge diodes 4 through 7.

The following are typical values of the components in the circuit of FIG. 1, given only by way of non-limiting example:

RATING TABLE

| | |
|---|---|
| 3 resistor 5.1 | 16 condenser 300 μF |
| 4 diode 1N4007 | 17 condenser 470 nF |
| 5 diode 1N4007 | 18 resistor 1.8 K |
| 6 diode 1N4007 | 19 condenser 220 μF |
| 7 diode 1N4007 | 20 resistor 8.2 K |
| 8 condenser 1.5 nF | 21 zener diode ZPY10 |
| 9 condenser 1.5 nF | 22 diode 1N4007 |

RATING TABLE-continued

| | |
|---|---|
| 10 thyristor F301 | 23 resistor 50 K |
| 11 condenser 100 μF | 24 condenser 8 μF |
| 12 transistor BC307B | 25 resistor 1K |
| 13 diode BAV20 | 26 resistor 1.5 K |
| 14 resistor 20 | |

If the current delivered to the load 15 is too high, the voltage across the Zener diode 21 exceeds the threshold voltage and transistor 12 switches from the disabled to the saturated state. In this situation, thyristor 10 no longer receives the gating pulses and remains disabled as long as the overload condition persists. The function of diode 13 is to fix the voltage value at the terminals of transistor 12, during the period in which the thyristor is non-conductive, regardless of the parameters of thyristor 10.

Let is now consider how the circuit works when the receiver is first turned on. As capacitor 24 is discharged, the pulse current applied to resistor 18 and normally taken to trigger the thyristor 10 is instead used to charge the said capacitor 24. Consequently, the thyristor 10 only conducts when capacitor 24 is charged.

When this occurs, during the first rectified A.C. voltage cycle, the effect of the 2-3 μsec time constant created by capacitor 3, 8, 17 and 24 and resistor 3, connected in series, is that the voltage across the terminals of resistor 18 is sufficient to make thyristor 10 conduct. However, the moment thyristor 10 starts conducting, it charges capacitors 11 and 16 with a much higher voltage than that across the terminals of capacitor 24. The reason for this is that capacitor 24 was charged at only 1/16 of the peak value available at the terminals of capacitors 17 and 24, connected in series.

As the discharge time constant of capacitor 24 is approximately 1 second, the voltage at its terminals effectively remains fixed at the present value with the result that thyristor 10 is extinguished after the first half wave and is not fired again in that, in the meantime, the gate-cathode voltage has been inverted. The thyristor 10 remains disabled until its gate terminal once more receives a positive voltage, with respect to the cathode, sufficient to fire it. During the period in which the thyristor is disabled, capacitors 11 and 16 discharge partly through the load (block 15, roughly 500 Ohm equivalent resistance) and partly, through diodes 13 and 22 and resistor 18, to thereby charge capacitor 24 which rises to a new voltage value.

When the voltage across the terminals of capacitor 11 falls below the value that the capacitor 24 has been brought up to, thyristor 10 is fired once more to repeat the cycle. This time capacitors 11 and 16 are charged to a higher voltage than before since they were not fully discharged. As the voltage of capacitor 24 is higher than that set previously, in that during the period in which thyristor 10 is non-conductive, capacitor 24 is recharged through diodes 13 and 22 and resistor 18, the threshold at which thyristor 10 is restarted is also higher. This is repeated for a number of cycles. Each time, thyristor 10 is disabled for a shorter length of time as the voltage at the terminals of capacitor 24 gets closer to the nominal voltage capacitor 11 should have. When capacitor 24 reaches its own nominal voltage, which is higher than that of capacitor 11, thyristor 10 is no longer disabled and the circuit can be said to have reached its steady state operating condition. Capacitor 24 remains charged until the receiver is turned off. When this happens, the capacitor 24 discharges through resistor 23 and the load consisting of block 15. By means of careful selection of the rating of resistor 23, it is possible to regulate the time taken for the circuit to return to initial operating conditions after the receiver is turned off, so as to overcome the drawbacks mentioned previously in connection with the prior art circuit using temperature dependent components. In the circuit described, this time is roughly 400 ms.

Figure 2:
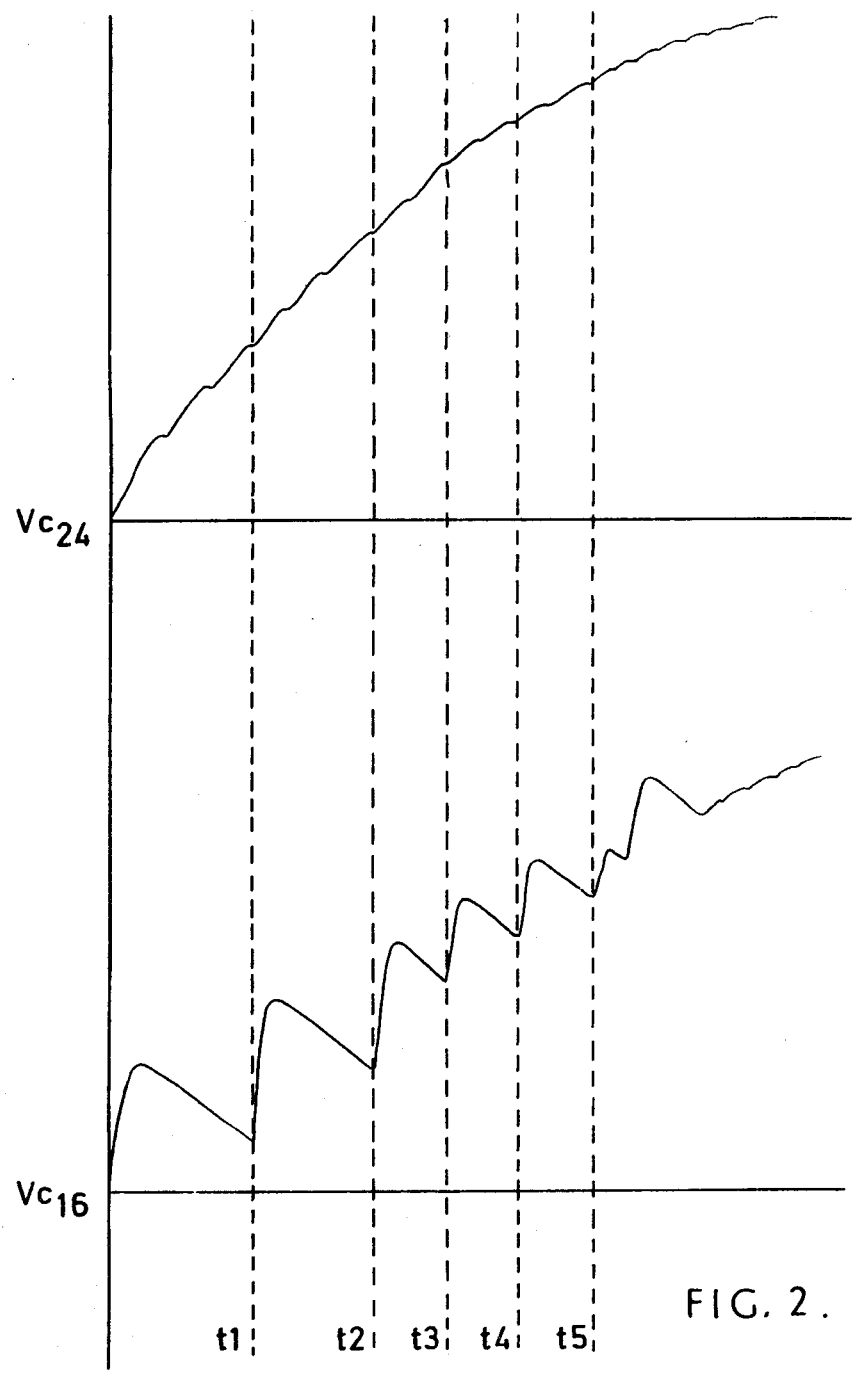
FIG. 2 shows the voltage curves, not to scale, at main points on the FIG. 1 circuit.

FIG. 2 shows clearly the voltage curves at the terminals of capacitors 16 and 24. $t_1$, $t_2$, $t_3$, $t_4$ and $t_5$ indicate the cycles, performed at various instants, by the circuit operating periodically.

The first cycle ranges from 0 to $t_1$ and shows the above voltage curve during the first conduction-disabling cycle of thyristor 10. From $t_1$ to $t_2$ thyristor 10 performs another conduction-disabling cycle while the voltage across the terminals of capacitor 24 rises. This is repeated for a number of cycles until normal running (i.e. steady state condition) is reached. Each of these cycles is the same, the only difference being that the length of time thyristor 10 is disabled gets shorter as the voltage of capacitor 24 increases.

I claim:

1. A D.C. supply circuit for a television receiver which has a load circuit, the supply circuit comprising rectifying means for rectifying an alternating mains supply, a smoothing circuit connected between the rectifying means and the load circuit of the television receiver, and delay means for delaying the application of the maximum voltage from the supply circuit to the load circuit when the receiver is initially turned on even if the receiver has just previously been turned on and then off, and said delay means comprising inhibiting means for inhibiting at least a portion of a certain number of cycles of the voltage from the supply circuit from being applied to said smoothing circuit so as to provide a D.C. voltage in which the number of cycles having portions inhibited from reaching the smoothing circuit determines the length of delay period provided before the said D.C. voltage reaches its maximum value at the load circuit.

2. A supply circuit as claimed in claim 1, in which said inhibiting means operates in a periodic fashion during a time interval corresponding to the required delay, said inhibiting means comprising a network of circuits with a preset time constant for determining said time interval.

3. A supply circuit as claimed in claim 2, in which the means for inhibiting includes a semiconductor device.

4. A supply circuit as claimed in claim 3, in which said semiconductor device is an electronic switch.

5. A supply circuit as claimed in claim 4, in which said electronic switch has a control terminal.

6. A supply circuit as claimed in claim 5, in which said electronic switch comprises a thyristor.

7. A supply circuit as claimed in claim 6, in which said thyristor is connected between the output of said rectifying means and the input of the load circuit.

8. A supply circuit as claimed in claim 7, in which clamping means are provided between the output of said rectifying means and the control terminal of the thyristor.

9. A supply circuit as claimed in claim 8, in which the control terminal of the thyristor receives a signal depending on the voltage at the terminals of said clamping means and the value of the D.C. voltage supplied to the load circuit.

10. A supply circuit as claimed in claim 8, in which said clamping means include a diode and capacitor.

11. A supply circuit as claimed in claim 8, in which said clamping means has no effect on circuit operation once the required delay has been achieved.

12. A supply circuit as claimed in claim 1, in which a circuit is provided for overload protection, which circuit cuts off current to the load circuit whenever the current supplied exceeds a preset threshold.

13. A D.C. supply circuit as claimed in claim 1, wherein said inhibiting means comprises a capacitor.

14. A D.C. supply circuit as claimed in claim 13, wherein said inhibiting means further comprises discharge means for quickly discharging said capacitor after the receiver has been turned off.

15. A D.C. supply circuit as claimed in claim 14, wherein said discharge means comprises a resistor coupled to said capacitor and adapted to be coupled to the load.

16. A supply circuit for supplying voltage to a load from A.C. power mains, said circuit comprising a controlled switch adapted to be coupled between the A.C. power mains and the load, and delay means for delaying the application of the maximum voltage to the load even if the supply circuit has just previously been turned on and then off, and said delay means comprising inhibiting means for controlling said controlled switch to inhibit at least a portion of a certain number of cycles of the A.C. power mains voltage from providing voltage to the load, said inhibited portions becoming successively shorter in time after said supply circuit is turned on, said certain number of cycles determining the delay until the load voltage reaches its maximum value.

* * * * *